Nov. 29, 1949 — C. F. GIBSON — 2,489,771
CYCLE HITCH

Filed June 10, 1947 — 2 Sheets-Sheet 1

INVENTOR.
CLARENCE F. GIBSON
BY Victor J. Evans & Co.
ATTORNEYS

Nov. 29, 1949          C. F. GIBSON          2,489,771
CYCLE HITCH
Filed June 10, 1947          2 Sheets-Sheet 2
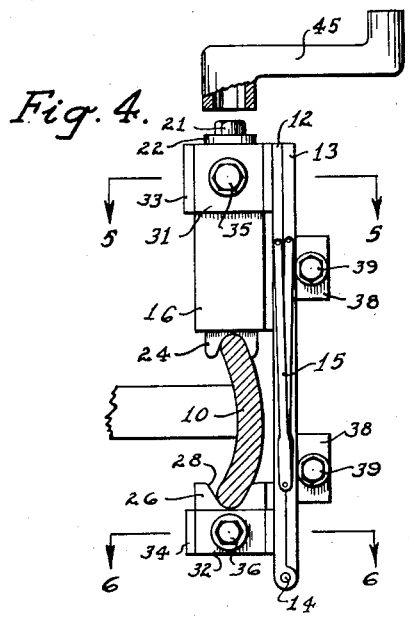
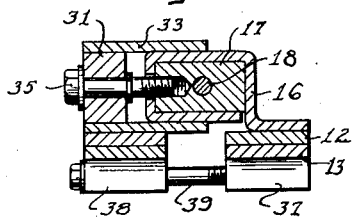 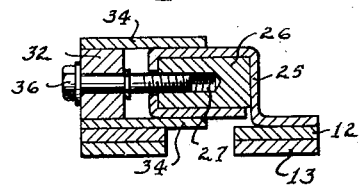
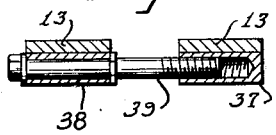
INVENTOR.
CLARENCE F. GIBSON
BY Victor J. Evans & Co.
ATTORNEYS Patented Nov. 29, 1949

2,489,771

UNITED STATES PATENT OFFICE 2,489,771

CYCLE HITCH

Clarence F. Gibson, Potter Valley, Calif.

Application June 10, 1947, Serial No. 753,706

3 Claims. (Cl. 280—292)

This invention relates to a cycle hitch adapted to be connected to the rear bumper of an automobile by means of which a bicycle or motorcycle can be trailed from the automobile.

It is an object of the present invention to provide a convenient hitch adapted for attachment to an automobile bumper by means of which the front or rear wheel of a bicycle or motorcycle can be fixed to the automobile bumper and the bicycle or motorcycle trailed therefrom.

It is another object of the present invention to provide a cycle hitch which can be permanently left on the automobile bumper and which has parts which when not in use can be raised or folded onto the bumper so as not to project from the rear of the automobile when not in use.

Other objects of the present invention are to provide a cycle hitch for automobile bumpers which is of simple construction, easily and quickly installed or removed from the bumper, adjustable to adapt the same to the different size wheels of the bicycle or motorcycle, inexpensive to manufacture and efficient in operation.

Figure 2:
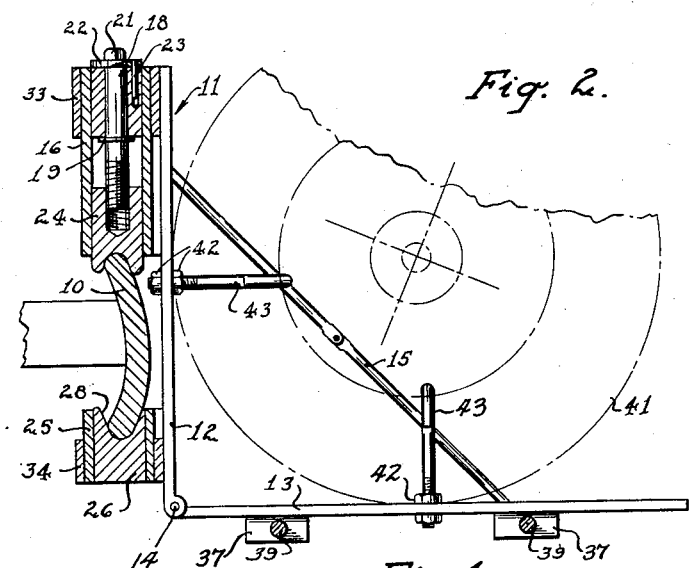
Figure 1:
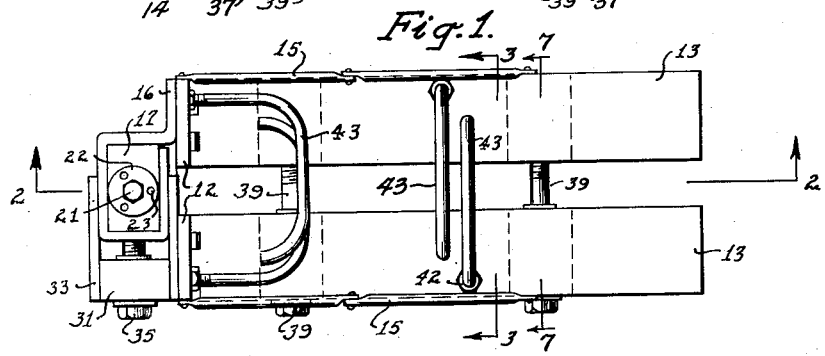
Figure 3:
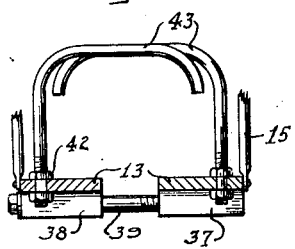

For a better understanding of the invention, reference may be had to the following detailed description taken in connection with the accompanying drawing, in which Fig. 1 is a top plan view of the cycle hitch device embodying the features of the present invention, Fig. 2 is a cross-sectional view of the hitch device taken on line 2—2 of Fig. 1, Fig. 3 is a fragmentary and transverse cross-sectional view taken on line 3—3 of Fig. 1, Fig. 4 is a side elevational view of the hitch device with the parts adapted to be extended rearwardly therefrom folded up to their out of use positions, Fig. 5 is a cross-sectional view taken on line 5—5 of Fig. 4, Fig. 6 is a cross-sectional view taken on line 6—6 of Fig. 4, Fig. 7 is a cross-sectional view taken on line 7—7 of Fig. 1, with parts omitted.

Referring now to the figures, 10 represents the rear bumper of an automobile to which my cycle hitch device may be attached. The cycle hitch device comprises two upright frames 11, each of which having a vertical portion 12 and a horizontal portion 13 hinged to the lower end of the vertical portion as indicated at 14 and adapted to be retained in its extended position by a collapsible bracket 15. When not in use the horizontal portion 13 can be raised to the position shown in Figure 4. The vertical portion has a bracket 16 formed of strap and secured to the top of one of the upright frames. Within the strap bracket is a block 17 which rotatably carries an adjusting screw 18 retained therein against axial displacement by a snap ring 19 and its head 21 resting upon a washer 22 which is held against rotation by a retaining pin 23 entering the upper end of the block 17.

On the adjusting screw 18 is a block 24 which is slidable into engagement with the top edge of the bumper 10. This block is carried in the lower end of the folded strap bracket 16 and is slidable up and down therein.

Below the strap bracket 16 and on the same frame 11 is a strap bracket 25 surrounding a block 26 with a threaded hole 27 therein. This block is grooved like upper block 24 and as indicated at 28 to engage the lower edge of the bumper 10. By this means the one frame is rigidly made fast to the bumper 10. Release of the adjusting screw 18 will permit the removal of the hitch device from the bumper.

The other frame 11 has upper and lower blocks 31 and 32 fixed within the guide plates 33 and 34 which slide respectively on the brackets 16 and 25 as adjusting screws 35 and 36 extending respectively upon blocks 31 and 32 are adjusted in blocks 17 and 26. By adjusting the screws 35 and 36 the frames 11 will be brought closer together or moved farther away whereby to adapt the frames to a different width wheel of the bicycle or motorcycle.

Also on the horizontal portions 13 of the frame 11 there are respectively blocks 37 and 38 between which there are extended adjusting screws 39. By adjusting the screws 39 the horizontal portions 13 will be retained and located in their proper positions to support the particular wheel of the bicycle or motorcycle. Thus it will be seen that the frames 11 can be adjusted with respect to one another and be retained as a locked and rigid unit on the bumper 10.

The bicycle or motorcycle wheel as indicated at 41 can be rolled onto the frames when the outer portions 13 have been extended. On both the horizontal and vertical portions of each frame there are connected by lock nuts 42, retaining hooks 43 bent to extend over and through the inside of the wheel rim. By adjusting the nuts 42 the hooks 43 can be brought down into locking engagement with the wheel rim.

A special wrench 45, Fig. 4, can be used for effecting the adjustment of the various adjusting screws. When the frames are to be folded they can be brought together in close relationship to consume less lateral space.

While various changes may be made in the detail construction, it shall be understood that such changes shall be within the spirit and scope of the present invention as defined by the appended claims.

I claim:

1. A cycle hitch device comprising two frames having vertical and horizontal portions, means for connecting the frames together for lateral adjustment with respect to each other whereby to adapt the device to receive and retain a front wheel of a cycle, common means for attaching the frames to a part of an automobile as a unit, and hook elements carried on the frame portions and adapted to extend inwardly through the rim of the cycle wheel when the frames are brought together.

2. A cycle hitch device as defined in claim 1 and said vertical and horizontal portions of the respective frames being hinged together so that they can be folded upon one another when the device is not in use, and collapsible brackets for retaining the portions of the frames adapted to be extended in their extended positions.

3. A cycle hitch device as defined in claim 1 and said common attaching means comprising vertically-extending parts, one of which being adapted to be releasably secured to the automobile part, brackets connected to the vertically-extending portions of one of the frames for retaining the attaching parts thereof and guides connected to the other frame and cooperating with the brackets of the one part to retain the vertical portions against fore and aft displacement with respect to one another, screw supporting portions between the guides and adjusting screws extending between the portions and the brackets of the one frame by means of which lateral adjustment of the frames with respect to one another can be effected.

CLARENCE F. GIBSON.

REFERENCES CITED

The following references are of record in the file of this patent:

UNITED STATES PATENTS

| Number | Name | Date |
| --- | --- | --- |
| 1,798,239 | Welker et al. | Mar. 31, 1931 |
| 2,431,400 | Iverson | Nov. 25, 1947 |